Oct. 1, 1963

C. J. KAYKO ETAL 3,105,750

ELECTROSTATIC FILTER APPARATUS

Filed July 29, 1959

INVENTOR.
CHARLES J. KAYKO
WILLIAM B. CLEVENGER
BY
Andrus + Starke
ATTORNEY.

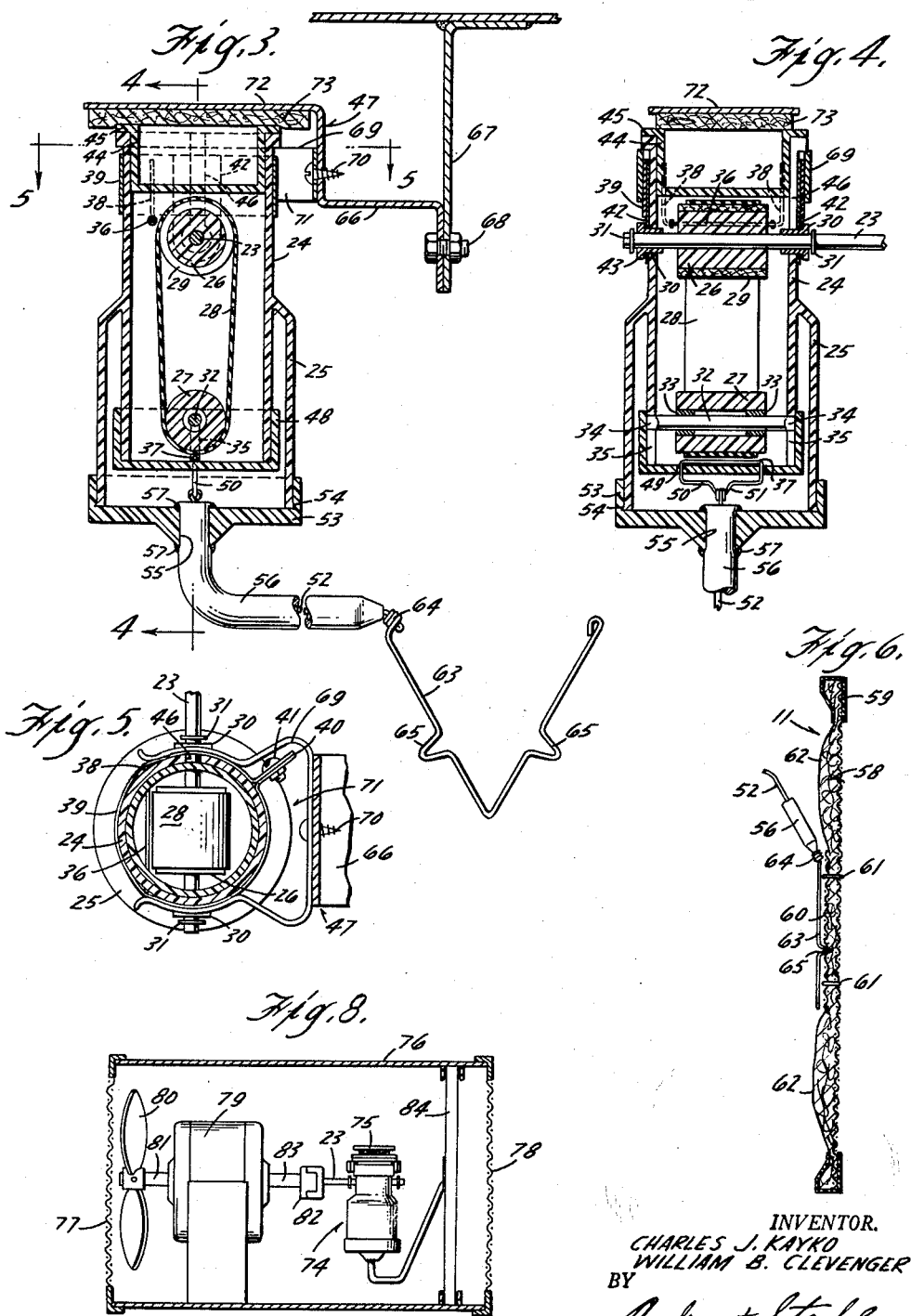

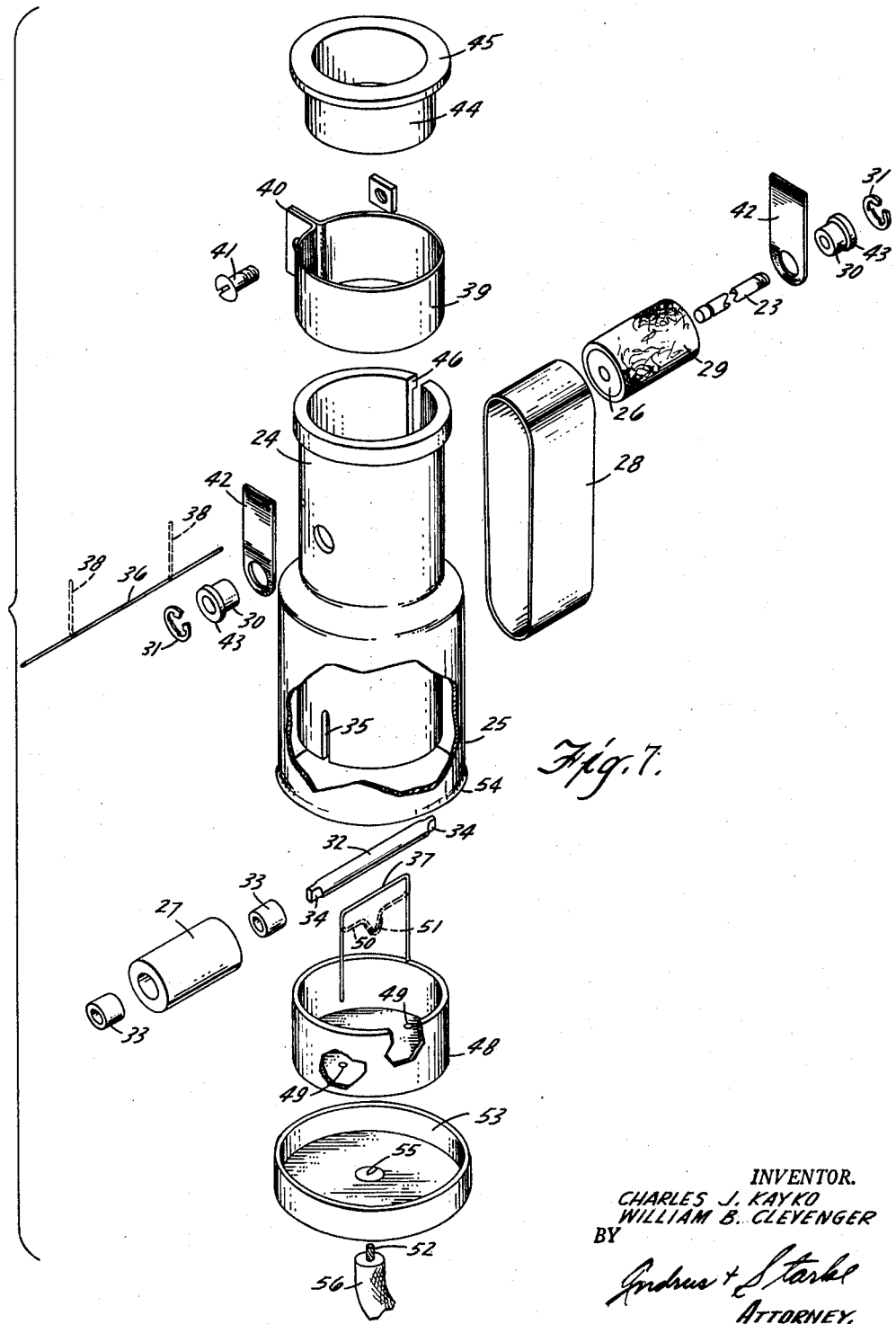

United States Patent Office 3,105,750
Patented Oct. 1, 1963

3,105,750
ELECTROSTATIC FILTER APPARATUS
Charles J. Kayko and William B. Clevenger, Jackson, Mich., assignors to McGraw-Edison Company, Milwaukee, Wis., a corporation of Delaware
Filed July 29, 1959, Ser. No. 830,363
5 Claims. (Cl. 55—103)

This invention relates to an electrostatic filter apparatus for removing solid matter from gaseous fluid such as air and is more particularly directed to an improved electrostatic generator and filter construction and attachment means.

Electrostatic filters or precipitators are used to filter and remove entrained particles from air by passing the air through an ionizing field and then attracting the charged particles to oppositely charged plates located downstream of the ionizing field. However, as more fully set forth in the co-pending application of Charles J. Kayko, entitled "Electrostatic Filter," Serial No. 700,061, filed December 2, 1957, now Patent 3,053,028, issued September 11, 1962, generally such apparatus employs dangerously high voltages which require carefully installed and maintained insulation to isolate all operating components from personnel who might contact the apparatus. Further, such equipment is generally large and expensive and cannot be commercially adapted for relatively small commercial or residential air treating equipment.

The several disadvantages of the above type prior art structures are eliminated by the electrostatic filter unit set forth in the previously referred to Kayko application. Generally, the electrostatic filtering apparatus disclosed in the Kayko application comprises an insulatingly supported filter medium which is located in contact with the air which is to be treated. A relatively high electrical potential is supplied to the filter medium. However, the electrostatic generator employed to generate the high potential is of the self-exciting Van de Graaff variety and is inherently incapable of providing a sufficient current to cause harm to a human being or the like.

The preferred electrostatic filter apparatus shown in the above Kayko application includes an electrostatic generator comprising a pair of spaced cylindrical electrode assemblies which are interconnected by a moving charge transfer belt. The electrode assemblies and charge transfer belt are supported within a substantially sealed tubular housing to prevent entrance of dust, moisture and other foreign matter which interferes with the operation of the generator. The housing includes removable end walls to allow cleaning and drying if necessary. Connecting electrode clamps encircle the opposite end portions of the housing and are connected to the adjacent electrode assemblies by small wire extensions passing through openings in the housing. The generator and a fibrous filter batt are mounted within a metal casing or duct forming an air passage. The mount for the generator comprises an insulating plate carrying spaced metal couplings adapted to supportingly grasp the outer electrode clamps. The plate is connected to the metallic housing with one metal coupling connected to the metallic housing and the opposite coupling connected to the filter batt. The mounting thus serves as an electrical connection between one of the electrode assemblies and the casing to establish and maintain a common potential which corresponds to the charge of the particles in the air entering the casing.

In order to provide continuous and highly satisfactory operation, short circuiting between the electrode assemblies of the electrostatic generator must be prevented. However, it is also desirable to maintain the electrostatic generator as simple in construction and as small as convenient and practical.

Dirt and moisture accumulate on the generator housing and the mounting plate between the electrode assemblies and the couplings and greatly reduce the resistance to current flow and may actually cause flashover between the electrodes. The difference in potential between the electrode assemblies and consequently between the casing and the filter batt is reduced or eliminated and the efficiency and functioning of the device is correspondingly adversely affected. This is particularly true where a self-excited generator is disposed in the air stream and the air stream constitutes the source of power for driving the generator. During a cooling cycle when the condenser stops, the air continues to circulate through the unit and moisture readily condenses on the housing and support. The moisture rapidly accumulates between the electrodes and mounting means and establishes a short circuit condition as described above.

Further, the clamp and coupling connecting the electrode to the filter batt creates a position of noticeable charge leakage to the casing. The potential difference between the dust particles and the like, which are at the same potential as the adjacent casing, and the filter batt is correspondingly reduced and the efficiency of the unit similarly decreased.

A charge spreader which is secured to the filter batt and connected to the generator electrode substantially covers one surface of the filter batt. Charge leakage from the screen to the adjacent casing also tends to somewhat reduce the operating efficiency of the device.

The present invention provides an improved electrostatic generator assembly having a substantially increased creepage path between the electrodes.

Generally, the present invention includes a single combined electrode support and electrical connector, which is secured to the generator adjacent the one electrode assembly and attached to the casing to establish substantially the same potential between the adjacent electrode assembly and the casing of the filtering apparatus. The opposite or discharge electrode assembly is enclosed within the housing and connected directly to the filter medium such that foreign matter cannot readily build up between the single mounting support and the discharge electrode assembly. The discharge electrode assembly comprises a relatively small electrode within the housing which is connected directly to the filter unit such that any leakage of the charge is onto the filter medium. Thus, the filter unit directly serves as the principal collector of the charge.

The discharge electrode assembly is connected directly to the filter unit by a single conductor which extends through a sealed opening centrally located in the adjacent end wall of the housing. The conductor includes an unusually thick electrically insulating sheath to essentially eliminate charge leakage from the conductor.

The generator unit constructed in accordance with one aspect of the present invention includes an electrically insulating housing within which the the several operating components of an electrostatic generator are substantially hermetically enclosed. One of the electrode assemblies of the generator is connected by a suitable conductor to a conducting member secured immediately adjacent the outer surface of the housing. A mounting clip releasably engages the adjacent conductor member to connect this electrode assembly to the housing. The mounting clip is adapted thus to serve as a common connector to the outer frame and to constitute the sole support to operatively carry the generator.

A stabilizing brace engaging the adjacent end wall of the housing is also provided on the clip within the scope of the present invention. The stabilizing brace eliminates any probability of disengagement or decoupling of the generator due to vibrations and the passing of the air across the generator and clip mount.

In accordance with another aspect of the invention, the collector end of the electrostatic generator housing is provided with an outer spaced skirt which greatly increases the interelectrode surface path between the electrode assemblies. Thus, in order to establish a short circuit, a complete conductive path must be provided downwardly along the outer surface of the housing and skirt and then upwardly along the inner surface of the skirt and again downwardly on the outer surface of the inner housing wall.

Consequently, the interelectrode surface is substantially increased and the danger of flashover or short circuiting is substantially eliminated.

In accordance with still another aspect of the present invention, a plate-like filter batt is employed. The connection of the generator electrode to the filter batt is made through a small, centrally located mesh structure. A releasable, resilient clip is secured to the terminal end of conductor from the discharge electrode assembly and includes ear-like members adapted to engage the mesh structure to quickly and firmly connect the electrode assembly to the filter batt.

The present invention provides a positive, inexpensive and simplified mount for an electrostatic generator in an air treating unit including means to practically prohibit establishment of a short circuit between the electrode connections to the generator. The charge leakage is reduced to a minimum and the connection to the filter medium is simple and positive.

The drawings furnished herewith illustrate the best mode presently contemplated for carrying out the invention.

In the drawings:

FIG. 3 is an enlarged sectional view of an improved electrostatic generator construction;

FIG. 4 is a sectional view of the generator construction taken on line 4—4 of FIG. 3;

FIG. 5 is a sectional view of the generator construction taken on line 5—5 of FIG. 3;

FIG. 6 is a fragmentary enlarged sectional view of a portion of the filter medium shown in FIGS. 1 and 2, and illustrates the attachment means to the generator lead and the charge spreader associated with the filter medium;

FIG. 7 is an exploded perspective view, a portion of which is in section, showing the detailed construction of the improved electrostatic generator shown in FIGS. 1–6; and FIG. 8 is a schematic illustration of the improved generator unit constructed in accordance with the present invention and associated with an air circulating device other than an air conditioner.

Figure 1:
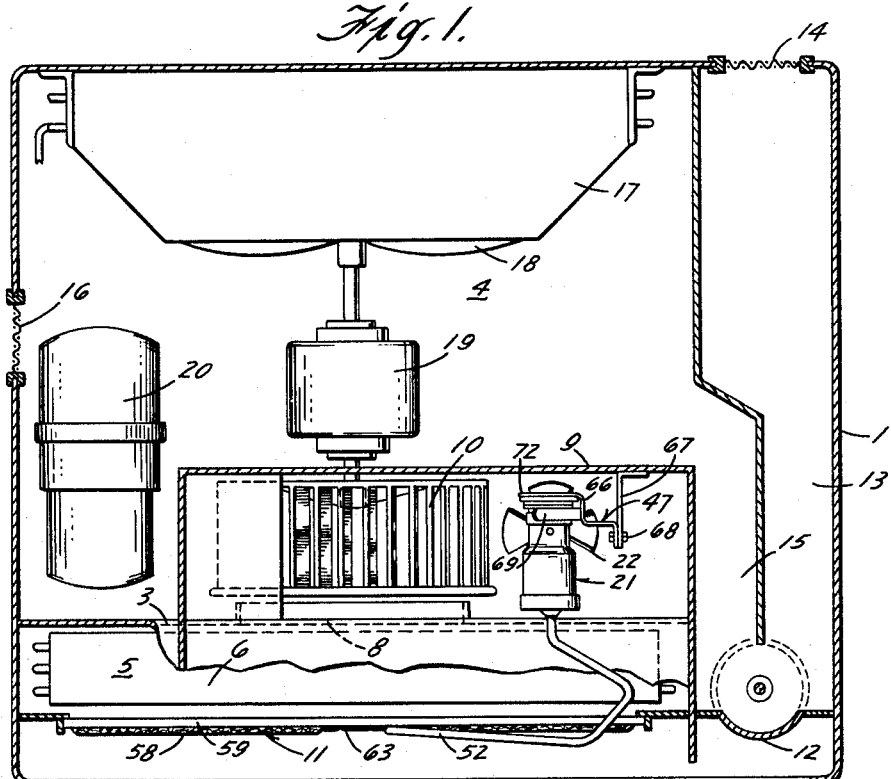
FIG. 1 is a plan view of a room air conditioning unit embodying the present invention, with portions broken away to show inner details of construction.
Figure 2:
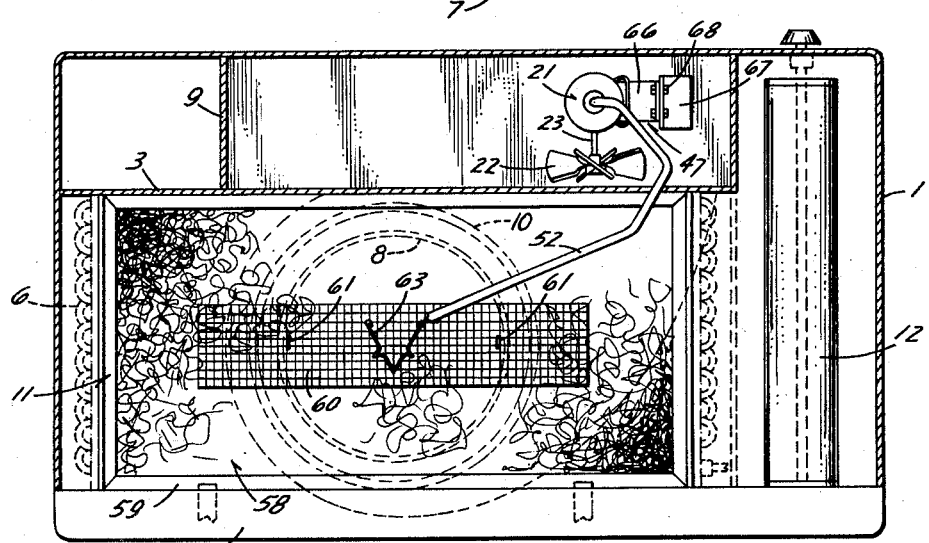
FIG. 2 is a front elevational view of the conditioner unit shown in FIG. 1 with the front portion removed.

Referring to the drawings and particularly to FIGS. 1 and 2, an air conditioning unit generally corresponding to the unit shown in the previously referred to Kayko application is illustrated. Generally, the air conditioning unit comprises an inverted cup-shaped housing 1 of suitable sheet metal secured to a base 2. A partition wall 3 extends vertically from the base 2 intermediate the depth of housing 1 and then horizontally forwardly in spaced relation to the upper wall of the housing forming air passages or ducts which define a rear heat dissipating compartment 4 and a front heat absorbing compartment 5. A cooling coil unit 6 is mounted within the back portion of the heat absorbing compartment 5 in the air path or stream which is established between a large opening 7 in the front wall of the housing 1 and a small wall opening 8 in the partition wall 3. A fan and air directing housing 9 is secured overlying the opening 8 in the partition wall 3 and includes sidewalls which extend forwardly over the horizontal portion of the wall 3 to direct the air back into the room. A centrifugal fan 10 is supported within the housing 9 with the fan inlet secured about opening 8 to draw air inwardly through the opening 7 and over the coil unit 1 and to discharge the air back to the room through the housing 9. An electrostatically charged filter 11 is mounted within the compartment 5 between opening 7 and coil unit 6 and serves to remove entrained particles from the air, as more fully described hereinafter.

As more fully described in the previously referred to Kayko co-pending application, a three-position damper 12 has a first position, shown in phantom line drawing to the left in FIG. 1, which selectively connects the opening 7 to an air inlet passage 13 which terminates in a screened opening 14 in the back wall of the housing 1. The damper 12 has a second position, also shown in phantom to the right in FIG. 1, which connects opening 7 to an air discharge passage 15 leading to the heat dissipating chamber 4. A screened opening 16 in the side wall of the housing 1 discharges the air from the conditioning unit. The third position of damper 12 is illustrated in full line in FIGS. 1 and 2 and the damper 12 then seals the opening 7 from both the air inlet passage 13 and air discharge passage 15 and the air in the air room is continually recirculated through cooling chamber 5 and housing 9.

The damper 12 is turned clockwise or counterclockwise, as viewed in FIG. 1, to selectively connect the opening 7 to the inlet passage 13 for drawing air into the room or to the discharge passage 15 for discharging air outwardly through the heat dissipating chamber 4. A shrouded condenser coil 17 and a condenser fan 18 are mounted within the heat dissipating chamber 4 such that whenever the opening 7 is connected in communication therewith, the fan 18 draws air inwardly through the passage 15, through the coil 17 and out through the opening 16.

A motor 19 is mounted within the heat dissipating chamber 4 to drive the fan 18 and to also drive the centrifugal fan 10 which is supported within the housing 9. A conventional compressor 20 may also be supported within the heat dissipating chamber 4 and connected in the conventional manner, not shown.

An electrostatic generator 21 charges the filter 11 which attracts and captures entrained particles from the air incident to circulation through the filter, as subsequently more fully developed.

The electrostatic generator 21 is mounted within the housing 9 in the airstream on the outer discharge side of the centrifugal fan 10. In the illustrated embodiment of the invention, the generator 21 includes an air driven propeller 22 which is rigidly secured to an input shaft 23. The generator 21 is mounted such that the airstream developed by the centrifugal fan 10 rapidly rotates the propeller 22 and the input shaft 23 to operate the electrostatic generator 21.

Referring particularly to FIGS. 3–5 and 7, the internal components of the generator 21 are generally similar to the corresponding components of the electrostatic generator shown in the previously referred to Kayko application. Consequently, certain portions of generator 21 are only described in such detail as to clearly set forth the improvements which are the subject matter of one aspect of the present invention.

The illustrated generator 21 includes a tubular plastic housing 24 having an outer skirt wall 25 which is integrally secured intermediate the length of the housing and extends concentrically therewith past the one end of the housing 24. The housing 21 is formed of any suitable rigid plastic such as polystyrene which has good dielectric qualities and molding characteristics. Two rotary cylinders 26 and 27 are rotatably mounted in axially opposite ends of housing 24 and rotatably support an endless belt 28 of silicone rubber or other suitable insulating material. A wool sleeve 29 is fixed to the outer periphery of the cylinder 26 such that rotating belt 28 constitutes an electrostatic charge transfer member.

The cylinder 26 is secured to shaft 23 for simultaneous rotation of the shaft and cylinder to drive the belt 28. Suitable oil impregnated sleeve bearings 30 are press fitted within diametrically opposite apertures in the single wall portion of the housing 24 to rotatably support the input shaft 23. Small snap rings 31 encircle the shaft 23 immediately adjacent the exterior surface of the bearings 30 to axially lock the shaft in place.

An idler shaft 32 is fixedly secured within the housing 24 axially spaced from shaft 23 and the cylinder 27 is journaled on the shaft 32 by metallic oil impregnated bearings 33. The idler shaft 32 is provided with flattened ends 34 which are disposed within suitable axial slots 35 extending in diametrically opposite sides of the inner wall of the adjacent tubular housing 24.

The transfer belt 28 is thus adapted to carry a charge between the cylinders 26 and 27. A first electrode 36 is mounted at cylinder 26 adjacent the incoming portion of belt 28 to absorb the positive charge and neutralize belt 28. The belt 28 is negatively charged in passing over cylinder 26. A collector electrode 37 is mounted immediately adjacent the cylinder 27 and takes the negative charge from belt 28 as it passes.

Referring particularly to FIGS. 3 and 7, the electrode 36 is a small U-shaped filament extending through aligned openings in the housing 24 and having axially outwardly extended side arms 38 immediately contiguous the exterior surface of the housing 24. The housing openings for electrode 36 are arranged to dispose the electrode parallel to and slightly spaced from the belt 28 immediately adjacent the incoming side of cylinder 26.

A metallic clamping band 39 encircles the portion of the housing 24 immediately above the bearings 30. The opposite circumferential ends of band 39 terminate in a pair of apertured lugs 40 and a nut and bolt assembly 41 releasably securing the clamping band about the housing. The arms 38 of electrode 36 are disposed between the housing 24 and band 39 to establish firm electrical contact between the electrode 36 and the band 39, as shown in FIG. 4, which constitutes a generator terminal.

Small connecting strips 42 of copper or other suitable conducting material are perforated at one end and disposed over on the bearings 30 between the housing 24 and an outer bearing flange 43. The strips 42 extend axially between the clamping band 39 and the outer surface of housing 24 such that tightening of the nut and bolt assembly 41 connects the band 39 in firm electrical contact with the bearings 30. Consequently, the bearing shaft 23 and band 39 are all maintained at the same potential as the electrode 36.

A cup-shaped cap 44 projects inwardly of the upper end of housing 24 generally coextensively with the clamping band 39 to close the adjacent end of the housing 24 and to provide a rigid backing to the clamping band 39. The cap 44 also reduces the inner volume of the housing 1. An encircling flange 45 is adapted to engage the upper end of the housing 24 to accurately locate the cap 44 within the housing. The cap 44 is formed of any suitable rigid material, preferably of the same material as that of housing 24.

A slot 46 extends from the axial edge of the housing 24 adjacent cap 44 in alignment with a bearing 30 for the cylinder 26. The internal diameter of housing 24 is slightly greater than the external diameter of cap 44 such that the cap fits loosely within the housing prior to tightening of clamp band 39. When the band 39 is clamped about the housing 24, the slot 46 closes slightly and the housing tightly engages the cap 44 which then absorbs the clamping forces.

The cap 44 thus constitutes a backing for housing 24 to prevent destruction of the housing due to stresses established by the clamping band 39 and by the vibration and the like which are established in the operation of the unit.

The one bearing contact strip 42 which extends upwardly from the bearing 30 covers the slot 46 to seal or close the slot 46. The cap 44 thus releasably seals the adjacent end of the housing 24 to prevent entrance of dirt, moisture, and other foreign matter. The cap 44 is however, easily removed in the event some foreign matter does enter the housing and therefore requires drying and cleaning of the generator components.

Referring to FIGS. 1–5, the electrode 36 is connected electrically to the metallic housing 1 by a resilient mounting clip assembly 47 which releasably engages the band 39 and is fixedly secured to the housing 1. The generator 21 is mounted adjacent the discharge end of fan 10 to subject propeller 21 to the high velocity discharging air stream. Although in practice the generator 21 is mounted as close as practical to the fan 10, the illustrated embodiment, shown in FIGS. 1 and 2, shows it elevated from fan 10 for clarity of illustration and description.

The mounting clip assembly 47 maintains the electrode 36 at the same potential as the housing 1.

The operation of the electrostatic generator 21 continuously transfers charge to the axially spaced electrode 37 and substantially increases the potential of the electrode. This higher potential is transferred to the filter 11 which attracts particles entrained in the air flowing through the filter. The entrained particles are attracted because they are at the same charge as the housing 1.

The collector electrode 37 is mounted in a cup-shaped end cap 48 substantially closing the end of housing 24 immediately adjacent the idler cylinder 27.

The electrode 37 is a small wire which is mounted in cap 48 coaxially of cylinder 27 and in alignment with the belt 28. The opposite ends of electrode 37 extend through suitable openings 49 in cap 48 and the extensions are bent toward each other immediately adjacent the exterior surface of the cap to loosely interlock the electrode to the cap 49. The slots 35 in housing 24 for shaft 34 and the cylinder 27 are cooperatively designed to establish a slight running clearance between the electrode 37 and the transfer belt 28 with the cap 48 bottomed onto the tubular housing 24. Consequently, as the transfer belt 28 is driven, an electrostatic charge is continuously transferred to the collector electrode 37 which consequently assumes a relatively high potential.

The cap 48 is cup-shaped and is designed to be press fitted over the outer surface of the housing 24 to substantially seal the adjacent end of the housing and establish a semi-sealed hi-tension chamber adjacent electrode 37. The cap 48 may include a small axial projection, not shown, on its inner surface which is adapted to mate with one of the slots 35 for the shaft 32 and establish the described alignment of the electrode 37 relative to belt 28. The cap 48 also automatically creates a uniform spacing between the electrode 37 and the transfer belt 28. The slots 35 collapse slightly due to the pressure of the cap 48 to resiliently retain the cap 48 and substantially seals the end of the inner wall of housing 1.

The very slight breathing action through the opening defined by the slots 35 immediately adjacent the shaft 32 and through the openings for electrode 37 as a result of temperature changes does not appreciably affect the operation on functioning of the electrostatic generator.

The electrostatic charge transferred to the electrode 37 is directly transferred to the filter 11, in the following manner.

The external ends of electrode 37 are bent toward each adjacent the outer surface of cap 48 as at 50 and terminate in overlapping and aligned U-shaped ends 51. A jumper lead 52 is tightly wound about the overlapped ends 51 of the electrode 37 immediately adjacent the outer surface of the cap 49 to establish firm electrical contact. The connection is merely a physical contact without any necessity of solder or other positive interconnection medium. The opposite end of lead wire 52 is connected directly to the filter 11 as subsequently described to continuously transfer the electrostatic charge from the electrode 37 directly to the filter.

The skirt wall 25 of housing 24 extends axially outwardly of the housing proper to encircle the overlapped ends 51 of electrode 37. A cup-shaped cap 53, preferably of a material similar to that of housing 24, is pressed over the end of the skirt wall 25 to substantially close the end of housing wall 25. The outer end edge of the skirt wall 25 and the adjacent inner peripheral edge of the cup-shaped cap 53 are provided with a cooperating flared flange and recess 54 to establish a positive seal therebetween. The cap 53 seals the outer end of the skirt wall 25 and prevents dirt and moisture from entering the housing.

The cap 53 is also provided with a central aperture 55 to accommodate the lead wire 52. A suitable heavy insulating sleeve 56 covers lead wire 52 and extends through the aperture 55. The diameter of aperture 56 and insulating sleeve 56 are substantially the same to create a tight fit. A lubricating sealant 57, such as Glyptal, is applied to the insulating sleeve 56, or to the aperture 55, prior to insertion through aperture 55 for easy assembly of the cap and lead wire 52. The sealant 57 subsequently sets and hermetically seals the central aperture.

The lower cap 53 thus substantially seals the connection of the lead 52 to the overlapped ends 51 of the electrode 37 within the skirt wall 25. The complete enclosure of the connecting components substantially prevents short circuiting of the components to the electrode clamp band 39 and the attached electrode 36.

The lead 52 extends from the end of the electrostatic generator 21 to the filter 11 and transmits the charge from the generator directly to the filter 11. Lead 52, as illustrated, includes a very heavy insulating sleeve 56 to essentially eliminate charge leakage from the lead. An extremely satisfactory lead 52 is the standard insulated conductor used in automobile ignition systems and the like to connect the spark plugs to the distributor. The latter type of conductor includes an excellent insulating covering and prevents appreciable leakage.

Referring particularly to FIGS. 2 and 6, the filter 11 includes a rectangular air pervious batt 58 which is secured within an encircling plastic frame 59.

The encircling plastic frame 59 surrounding the filter batt 58 is formed of any suitable material such as a thermosetting polyester. The plastic frame 59 inhibits the leakage of charge from the filter batt 58 and consequently the latter is maintained at a very high potential with respect to the casing 1. The frame 59 furthermore imparts a rigidity to the filter batt 58 and facilitates its handling and assembly.

Filter batt 58 is any suitable medium adapted to be electrostatically charged to attract and hold the entrained particles in air passed through the batt. The material preferably is physically strong and heat resistant in order that it may be cleaned by washing in lukewarm suds and the like without physical destruction. The filter batt should include excellent dielectric property in order to minimize charge leakage therefrom. As set forth in the previously referred to copending application of Charles J. Kayko, metallic and dielectric filamentary material such as glass fiber, aluminum fibers and the like provide highly satisfactory material.

A wire mesh 60 is attached to the central portion of the filter batt 58 by a plurality of staples 61 and serves to distribute the charge to the filter batt. The wire mesh 60 is particularly useful where the filter batt 58 is formed of a dielectric material rather than metallic filamentary material.

The wire mesh 60 is selected of such dimensions as to provide a substantial marginal area 62 between the periphery of the wire mesh and the frame 59. The marginal area 62 substantially eliminates charge leakage to the housing 1. The large marginal area 62 also introduces or permits a large assembly tolerance and the attachment of the mesh 60 is consequently readily adapted to commercial fabrication.

Referring particularly to FIGS. 2, 3 and 6, a V-shaped clip 63 releasably interlocks with the wire mesh 60 and is secured to the extended end of the heavily insulated lead 52 to connect filter 11 to generator 21. The V-shaped clip 63 is defined by a pair of coplanar arms the end of one of which is tightly wrapped or coiled about the end of lead 52 as at 64 to establish a simple and firm electrical connection. Integral ears 65 are formed by suitable lateral U-shaped bends intermediate the length of arms defining the V-shaped clip 63. The ears 65 extend laterally outwardly and angularly from the plane of the clip arms in a corresponding direction. To attach the clip 63 to the wire mesh 60, the clip arms are compressed and the ears 65 inserted into correspondingly spaced openings in the mesh 60. The clip arms are then released and the ears 65 move under the adjacent portions of the wire mesh 60 to hold the arms of the clip 63 in firm engagement with the adjacent wire mesh. The clip 63 thereby electrically connects the lead 52 to the wire mesh 60.

The heavily insulated lead 52 carries essentially the charge complete from the generator electrode 37 to the wire mesh 60. The wire mesh 60 constitutes a charge spreader which rapidly distributes the charge over the air pervious batt 58. The wire mesh 60 and the filter batt 18 thus directly serve as the collector electrode for accumulating the electrostatic charge. Any leakage from the wire mesh 60 is directly onto the filter batt 58 and consequently very small losses result.

Small charge leakage from filter batt 58 to the adjacent casing 1 may occur. The relatively large marginal area 62 however maintains the greater charge centrally of the batt and holds charge leakage to a very minimum.

Referring particularly to FIGS. 3–5, the electrostatic generator 21 is supported in the air stream by the mounting clip assembly 47 to drive the generator propeller 22 incident to circulation of air through the housing 9. The generator 21 establishes and maintains a high potential charge on the mesh 60 and the filter batt 58.

The mounting clip assembly 47 generally comprises a double-stepped bracket 66 having a first portion which is secured to a wall member 67 of the housing 1 by a pair of nut and bolt units 68. A U-shaped clip 69 is secured by a metal screw 70 to a transverse bracket portion which extends generally parallel to the portion secured to housing 1 and to the axis of the generator 21. The U-shaped clip 69 is adapted to tightly grasp the contact band 39 to support generator 21 and to thereby establish firm electrical connection of the band to the housing 1.

The U-shaped clip 69 engages the band 39 with the band lugs 40 disposed generally within one of the corners between the base of the clip 69 and one of the arms of the clip. Clearance 71 between the base of the clip 69 and the housing 24 is selected to be less than the depth of the lugs 40. Consequently, only very limited angular movement between the mounting bracket 66 and the electrostatic generator 21 is possible. Consequently, the axis of the propeller shaft 23 may be pre-oriented in the factory to disposed the propeller in the most effective position in the air stream. The lugs 40 further act as stops to prevent rotation of the generator 21 due to vibration and other influential forces which are developed during the operation of the assembly.

The bracket 66 includes a foot portion 72 which protrudes over the closure cap 44 for the housing 24. A suitable shock absorbing material 73 of fiber or the like is disposed between the foot portion 72 and the cap 44. The contact of the foot portion is perpendicular to the gripping of the clip 69 and eliminates end play in the mounting. The bracket 66 thus serves to provide a stable and positive mechanical attachement and electrical connection of the electrostatic generator 21. The single mounting clip assembly 47 provides a quick detachable single-end mount and connector to the electrostatic generator 21.

The operation of the embodiment of the invention illustrated in FIGS. 1-7 is summarized as follows. For a more detailed discussion of the functioning and phenomena of the several standard portions of the apparatus, reference can be made to the previously described Kayko application and the like.

The damper 12 is assumed to be in the full line position of FIG. 1. The fan motor 19 is energized to drive the centrifugal fan 10 and thus establishes an air stream flowing inwardly through the large opening 7 in the front wall of casing 1. The air is drawn through the filter batt 58 and the coil 6 and discharged back into the adjacent area through the passage defined above the dividing wall 3 by the upper portion of the housing 9.

Dust particles and the like which are in the air passing inwardly through opening 7 do not carry any charge and are at ground potential. The casing 1 is also at ground potential.

The air stream drives the propeller 22 of the electrostatic generator 21 and thus actuates the electrostatic generator with the electrode 36 constituting a low negative potential electrode and the electrode 37 constituting a high negative potential electrode. The filter batt 58 is therefore given a high potential relative to the casing 1 and the dust particles in the incoming air. The filter batt 58 may conventionally be raised to a relative potential difference of 10,000 to 20,000 volts with respect to the casing and the dust particles passing through the filter batt. The high potential on the batt 58 strongly attracts the opposite or relatively low potential charged particles and firmly attaches them to the filter batt.

The single mounting assembly 47 rigidly and firmly mounts the electrostatic generator 21 in position with the electrode 36 in electrical connection with the casing 1 to maintain the casing at the same potential as the upper electrode assembly. The cooperating lugs 40 and the base of the clip 69 provide a simple and positive means for positioning the electrostatic generator in the most advantageous position.

The indented sealing cap 44 of the generator 21 adjacent the assembly 47 tightly seals the electrostatic generator against foreign matter and establishes a rigid backing to the clamping band 39. Consequently, the band is tightly clamped in place to create a firm and positive electrical connection to the electrode 36 without destruction of the adjacent housing 24.

The double-wall construction adjacent the collector electrode and the adjacent double seal established by the end caps essentially eliminates any danger of flashover between the exposed clamping assembly 47 and the collector electrode. The outer skirt wall greatly increases the exterior creepage path between the electrodes of the electrostatic generator. This is exceedingly advantageous in electrostatic generators for use in air conditioning units and insures a long life and dependable operation of the generator. The substantially sealed ends of the housing prevent accumulation of moisture, dirt and the like within the housing and essentially eliminate creepage of charge over the shorter interior surface between the electrode assemblies, in the illustrated embodiment of the invention.

The double cap construction adjacent the collector electrode provides a very simple and ready means for quickly assemblying and positioning the collector electrode.

The V-shaped clip 69 and wire mesh 60 creates a very simple and ready means for connecting the electrostatic generator 21 directly to the filter 11. Consequently, the filter 11 may be readily removed for replacement and maintenance without any special skill or experience. The clip tension provides a positive resilient connection to the filter batt 11 and eliminates the danger of the clip being removed by vibration of the unit during the operation of the conditioner.

The present invention thus provides an electrostatic generator which may be readily mounted within a suitable casing and releasably connected to the filter medium. The danger of flashover and malfunctioning of the device because of accumulating dirt and moisture is essentially eliminated.

FIG. 8 illustrates a second embodiment of the invention as applied to an air cleaning device without any other conditioning of the air.

An electrostatic generator 74 generally corresponding to the previously described generator is mounted by a corresponding mounting bracket 75 within a suitable metallic casing 76 constituting an air duct.

The opposite ends of the casing 76 are substantially open with suitable cover screens 77 and 78 secured to the casing to prevent entrance of relatively large matter into the casing. A double-ended shaft motor 79 is mounted within one end of the casing 76 and a fan blade 80 is secured to the shaft end 81 adjacent the screen 77. The fan blade 80 is adapted to establish an air stream through the casing 76 incident to energization of the motor 79.

In the embodiment of the invention illustrated in FIG. 8, a suitable coupling 82 connects the opposite shaft end 83 of the motor 79 directly to the input shaft 23 of the electrostatic generator 74 to positively and directly drive the generator.

The mounting bracket 75 which corresponds to the bracket 66 of FIGS. 1-7 is welded to the interior of the casing 76. The bracket 75 thus simultaneously supports the generator 74 within casing 76 and connects the positive charge absorbing electrode 36, not shown in FIG. 8, of the generator 74 to the casing 76.

An electrostatic filter 84, corresponding to filter 11 of the previous embodiment, is mounted immediately inwardly of the screen 78 such that the air stream passes through the filter 84.

The embodiment of the invention illustrated in FIG. 8 is adapted to be a portable appliance for location in any of several rooms or locations.

The construction of FIG. 8 is also readily adapted to direct mounting within individual air ducts, not shown, of the air conditioning system in a residential dwelling and the like. A low wattage motor, not shown, may be fitted directly into the duct for the sole purpose of driving the generator while the air is being circulated through the system by means of a centrally located circulating fan, not shown.

The air-driven generator illustrated in FIGS. 1-7 however offers a silent, vibration proof and flexible coupling which may be easily removed for replacement or maintenance without dismantling other portions of the apparatus other than a suitable cover portion.

The present invention thus in its various aspects provides an improved means for mounting and connecting an electrostatic generator within an electrostatic filtering apparatus. The generator housing of the present invention practically eliminates any danger of flashover between the terminals of the electrostatic generator and removes the danger of rendering the apparatus inoperative because of thin films of dust and humidity which often build up on the outside of the housing.

The relatively greater obstruction to flashover between the electrodes of the electrostatic generator of the invention particularly adapts the electrostatic filter for air cooling devices where air circulation is continued after the condenser is shut down. The electrostatic generator of the present invention may be readily mounted within this air stream notwithstanding the relatively high moisture condensation on the housing.

The direct connection of the electrostatic generator to the filter without the conventional intermediate collector assemblies at the generator substantially eliminates charge leakage and increases the efficiency of the conditioning unit.

The present invention thus provides an improved and very efficient electrostatic generator which may be readily and inexpensively constructed and mounted within any suitable or desired air conditioning and treating assembly.

Various modes of carrying out the invention are contemplated as being within the scope of the following claims particularly pointing out and distinctly claiming the subject matter which is regarded as the invention.

We claim:

1. An electrostatic generator assembly adapted to be mounted within an air treating apparatus having a metallic air duct and an electrostatic filter medium in the air stream to remove entrained particles in the air stream, which comprises a first and second electrode assembly coupled by a movable charge transferring member, means associated with said transferring member to establish a predetermined charge on the transferring member, a generally tubular insulating housing encircling said electrode assemblies, means connected to the housing and the electrode assemblies and supporting said electrode assemblies within said housing in spaced and insulated relation, and an encircling skirt wall secured to the housing intermediate said electrode assemblies to prevent direct passage of a charge between said electrode assemblies along the wall of the housing carrying the skirt and extending axially of the housing to substantially increase the exterior creepage path between said electrode assemblies.

2. An electrostatic generator assembly adapted to be mounted within an air treating apparatus having a metallic air duct and an electrostatic filter medium in the air stream to remove entrained particles in the air stream, which comprises a first and second electrode assembly coupled by a movable charge transferring member, means associated with said transferring member to establish a predetermined charge on the transferring member, a generally tubular insulating housing encircling said electrode assemblies, said housing having a double wall construction adjacent said second electrode assembly, end closure walls secured to the end of the inner wall of the double wall of housing and to the opposite end of the housing to substantially seal the housing, means connected to the housing and the electrode assemblies and supporting said electrode assemblies within said housing in spaced and insulated relation, a conductor connected to the second electrode assembly and projected outwardly through the adjacent end wall, means to connect the conductor to said filter medium, and a connector clamped about the single wall portion of the housing adjacent the first electrode assembly and electrically connected to the first electrode assembly and to the metallic air duct.

3. In an electrostatic filtering apparatus for removing entrained particles from air flowing through a metallic casing defining a fluid passage and having a filter medium disposed within the air passage, an electrostatic generator having a tubular housing and a pair of axially spaced electrode assemblies each having an electrode carried by the housing and connected by a charge transferring means having means associated therewith for establishing a predetermined charge on said means and establishing a high potential on the electrode in one electrode assembly and a low potential on the electrode in the other electrode assembly, said electrode assembly having the low potential electrode including a conducting portion extending outwardly through the adjacent side wall of the housing, a single releasable support secured to the metallic casing and having a clamping portion encircling the generator housing adjacent only the low potential electrode and substantially spaced from the high potential electrode, a stabilizing member forming a part of said support and extending over the adjacent end of housing and being tensioned to bear against the end of the housing, said support constituting the sole support for said generator, said support including conducting means electrically connecting said low potential electrode to said metallic casing to impart the potential of the electrode to the entrained particles in the air, and means connecting the high potential electrode to said filter medium.

4. In an electrostatic filtering apparatus for removing entrained particles from air flowing through a casing and contacting a filter medium disposed within and electrically insulated from the casing for contact with the air and having an electrical charging terminal means, an electrostatic generator having an electrically insulated tubular housing open at the opposite ends and having a pair of spaced electrode assemblies mounted within the housing and connected by a charge transferring means having means associated therewith to establish a predetermined charge on the transferring means, a second of said pair of spaced electrode assemblies being connected to the electrical charging terminal means, mounting means coaxially clamped about the open end portion of said housing opposite from the second of said spaced electrode assemblies and electrically connected to the first electrode assembly, said housing having an axial slot extending generally coextensively of the mounting means to establish a resilient connection, a rigid cup-shaped cap adapted to project inwardly of the open end of the housing to seal the housing and to establish a rigid backing to said clamping means, and means adapted to attach the mounting means to the casing to constitute the sole support of the generator and to electrically connect the first electrode assembly to the casing.

5. An electrostatic generator assembly adapted to be mounted within an air treating apparatus having a metallic air duct and an electrostatic filter medium mounted in the duct and the air stream to remove entrained particles in the air stream, which comprises, a first electrode assembly and a second electrode assembly coupled by a movable endless charge transferring device, means associated with said transferring device to establish a predetermined charge on the transferring device, a generally tubular insulating housing having an inner wall and an outer wall spaced from the inner wall with a peripheral connection therebetween intermediate the length of the inner wall to define a double wall portion, means supporting said electrode assemblies in axially opposite ends of the housing with the first electrode assembly located within the double wall portion, an end cap secured to the end of the inner wall adjacent the first electrode assembly, said first electrode assembly including an electrode disposed adjacent the charge transferring device and attached to said end cap with a portion of the electrode extended through the cap to the exterior of the cap, a second end cap secured to the outer wall of the housing to substantially seal the same, a conductor connected to the electrode portion between said end caps and projected outwardly through a sealed opening in said second end cap, said conductor being adapted to be connected to said filter medium, and a connector clamped about the housing adjacent the second electrode assembly and electrically connected to the second electrode assembly.

References Cited in the file of this patent

UNITED STATES PATENTS

| | | |
|---|---|---|
| 1,947,220 | Nickle | Feb. 13, 1934 |
| 2,171,242 | Lindenblad | Aug. 29, 1939 |
| 2,297,601 | Williams | Sept. 29, 1942 |
| 2,343,338 | Steele | Mar. 7, 1944 |
| 2,579,441 | Palmer | Dec. 18, 1941 |
| 2,589,463 | Warburton | Mar. 18, 1952 |
| 2,786,544 | Connor | Mar. 26, 1957 |
| 2,847,082 | Roos | Aug. 12, 1958 |
| 2,858,501 | Gale | Oct. 28, 1958 |
| 2,883,606 | Gale | Apr. 21, 1959 |
| 3,053,028 | Kayko | Sept. 11, 1962 |

FOREIGN PATENTS

| | | |
|---|---|---|
| 437,308 | Italy | July 30, 1948 |
| 808,355 | Germany | July 12, 1951 |